3,155,597
EXTRACTIVE SEPARATION PROCESS

David Cornell, Stillwater, Okla., and Gail H. Birum, Dayton, Ohio, assignors to Monsanto Company, a corporation of Delaware
No Drawing. Filed June 23, 1961, Ser. No. 119,048
19 Claims. (Cl. 202—39.5)

The present invention relates generally to the separation, concentration, and/or purification of hydrocarbons having various degrees of unsaturation. It is an object of the invention to separate close-boiling hydrocarbons of the classes of paraffins, monoolefins, diolefins, naphthenes and aromatic hydrocarbons by the use of α-oxophosphonates having the following structural formula:

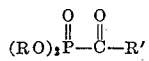

wherein R represents an alkyl radical having up to 10 carbon atoms, the preferred range being 1 to 4 carbon atoms, which alkyl radicals can be the same or different, and R' is selected from the group consisting of hydrocarbon, alkoxy radicals preferably having from 1 to 6 carbon atoms, aryloxy and alkyl substituted aryloxy radicals wherein the aryl moiety contains from 6 to 10 carbon atoms and the alkyl substituent contains up to 3 carbon atoms as the extraction agents. It is also an object of the invention to carry out the said separations by means of an extractive distillation method employing the said α-oxophosphonates as the extracting agent.

In a number of hydrocarbon processing operations including cracking, reforming, aromatizing, and dehydrogenating, a wide spectrum of hydrocarbons is formed having various degrees of unsaturation or of solubility parameter, cohesive energy density, or internal pressure. It is therefore desirable to be able to make a type separation in order to remove substantially all of each individual family group of hydrocarbons, i.e., the paraffins, monoolefins, diolefins, naphthenes and aromatic hydrocarbons. Further separations such as one olefin from another is also a desired objective. Conventional distillation methods are often poorly adapted to the separation and recovery of such classes of hydrocarbons in view of the small difference in the boiling points of the respective compounds. It has also been found that azeotropic distillation in which the azeotrope agents are added to reduce the boiling point of certain components is impractical because of the separation difficulties between such agents and the components with which the azeotrope has been formed.

It has now been found that the use of the above-described α-oxophosphonates makes it possible to conduct extractive separations among the above-described classes of hydrocarbons. In carrying out the present invention utilizing the said α-oxophosphonates in an extractive distillation process the phosphorus compound or a mixture thereof is introduced into a distillation column at a point near the top of the column. In this case the one hydrocarbon fraction is withdrawn as the overhead product, while the other hydrocarbon group is obtained as a bottoms product dissolved in the α-oxophosphonate as the extractive distillation solvent.

The present method is applicable to the separation of hydrocarbons of the classes of paraffins, monoolefins, diolefins, naphthenes and aromatic hydrocarbons, as well as many individual members within such a class, for example, butene-2 from butene-1. The extractive distillation process using the said α-oxophosphonates yields a vapor fraction containing the more volatile of the said hydrocarbons. The volatility here referred to is that of the hydrocarbon when in solution in the α-oxophosphonate solvent, such volatility being the product $\gamma P_V$, where $\gamma$ is the activity coefficient and $P_V$ is the vapor pressure of the hydrocarbon.

Relative volatility, $\alpha$, is therefore the ratio of the $\gamma P_V$ products for two hydrocarbons.

It has been found that the present method is efficacious as an extractive process with a wide variety of crude hydrocarbon mixtures. Examples of such starting mixtures include the paraffin, monoolefin and diolefin mixture obtained in the dehydrogenation of butane and butene in order to produce butadiene as the desired product. Another type of crude hydrocarbon mixture which is readily separated by the method of this invention is the octane-octene mixture resulting from the dehydrogenation of a $C_8$ fraction. Another type of hydrocarbon fraction which can be separated by the present process is a mixture of 5 carbon atom hydrocarbons obtained in a dehydrogenation of pentenes including isopentane in order to produce isoprene. The impurities in such a crude mixture include normal pentane, pentene-1, 2-methylbutene-1, and 2-methylbutene-2. Another crude hydrocarbon mixture readily separated by means of the present method is the mixture of naphthenes and aromatic hydrocarbons obtained in the aromatizing of normal hexane and the subsequent dehydrogenation of such crude mixture to produce benzene.

The proportion of the α-oxophosphenates employed in the present extractive separation method varies over the range of from 0.5 to 10 moles of the said phosphonate per mole of the crude hydrocarbon mixture, a preferred range being from 1 to 5 moles. The separation processes may be operated over a wide range of temperatures such as from 100° F. to 300° F., the upper temperature being limited by the tendency of the hydrocarbon to polymerize rather than by any inherent limitation of the extractive distillation process. The use of vacuum or pressure conditions in addition to atmospheric pressure is also a part of the present invention, such expedients being utilized in accordance with conventional practice in order to aid in the separation of low boiling components or in order to maintain high boiling components in the liquid without undue volatilization.

The apparatus employed in the extractive distillation process is typical of the equipment available in this field. It is obvious that such a distillation process may be conducted with any conventional distillation column of the bubble-plate, packed, or sieve-plate type as may be desired. The selection of the best reflux ratio, size and number of plates and other details of column design necessary in order to obtain the desired degree of purity will be obvious to one skilled in the art having the benefit of the present disclosure. If necessary to prevent or minimize the polymerization of unsaturated compounds, conventional polymerization inhibitors may also be used.

The apparatus employed constitutes a conventional extractive distillation column in which the crude mixture of hydrocarbons is charged to the middle region of a column with reflux being returned near the top of the column, while the overhead vapor fraction is withdrawn as an enriched stream of the material with the higher degree of saturation (or lower solubility parameter). The α-oxophosphonate solvent from any source is introduced into the column at a plate located several plates below the top of the column. The bottom stream leaving the column contains the material with the lower degree of saturation or higher solubility parameter, together with the α-oxophosphonate solvent. Where more than one class of hydrocarbons is present in the vapor and/or liquid fractions, these fractions may be separated and further treated with the extractive distillation solvent to effect further hydrocarbon separations or, where the boiling points or miscibilities of the various hydrocarbons are sufficiently different, other techniques such as fractional distillation or solvent extraction separation are suitable.

In subsequent extractive distillations the more volatile hydrocarbon(s) is withdrawn as overhead vapors and the less volatile hydrocarbon(s) is withdrawn as liquid bottoms. The mixture of solute and solvent in the bottoms fraction is then separated into its components by conventional stripping or separation means, which may comprise the use of water washing, solvent extraction, distillation, or freezing, by which means one may obtain the bottoms solute in the desired pure state. For example, one may employ a conventional fractionation or stripper column, wherein by simple fractional distillation the solute from the bottoms product is recovered as the overhead fraction of the stripper in pure form. In another type of column the bottoms solute in admixture with the solvent is fed into the middle region of a column, while steam or another heated inert gas is fed to the bottom of the column. The overhead product from such stripping operation is the pure solute, while the solvent is obtained as the bottoms product which is then dried and recycled to the main distillation column, as described above.

It has been found that the above-described $\alpha$-oxophosphonates are particularly advantageous in the present process since these materials are relatively stable against decomposition and are non-reactive with respect to the hydrocarbons as well as any impurities which are conventionally found in such crude mixtures. It is also an advantage that the $\alpha$-oxophosphonates are generally relatively non-toxic and are relatively inexpensive materials. The use of $\alpha$-oxophosphonates as herein disclosed makes it possible to separate close-boiling hydrocarbons in a considerably smaller column than would be required for conventional distillation.

The comparative selectivity of an extractive distillation solvent is best determined by its specific efficiency with respect to the hydrocarbon pair which are to be separated in the present method. This efficiency may be expressed as the relative volatility of the two hydrocarbons in the presence of the $\alpha$-oxophosphonate solvent. The equation which expressed this relative volatility (alpha) is:

$$\alpha = \frac{(\gamma P_v) \text{ hydrocarbon 1}}{(\gamma P_v) \text{ hydrocarbon 2}}$$

where (gamma) represents the activity coefficients defined by the following equation:

$$\gamma_1 = \frac{Y_1 P_T}{X_1 P_{V_1}}$$

In the above equation $X_1$ and $Y_1$ represent the mole fractions of a given component in the liquid and vapor phases, respectively, while $P_V$ and $P_T$ represent the vapor pressure of the given component, and the total pressure of the system respectively.

In addition to selectivity, solubility of hydrocarbons in the $\alpha$-oxophosphonates must be considered. The quantity of hydrocarbon dissolved in the solvent is governed by the temperature and pressure of the separation and by the character of the solvent and the hydrocarbon system.

The term, solubility parameter, is used in preference to the terms internal pressure or cohesive energy density. These terms are essentially equivalent. Cohesive energy density is the square of the solubility parameter, while internal pressure is 41.311 × cohesive energy density.

The definition of the solubility parameter referred to in the previous paragraphs is as follows:

$$\delta = (\Delta E/V)^{1/2}$$

$\Delta E$ = internal energy of vaporization, calories/(g. mole)
$V$ = molal liquid volumn, cc./(g. mole)

For the condition of ideal gases, $\Delta E$ may be calculated from handbook values of the latent heat of vaporization, $\Delta H_v$. The temperatures are expressed as degrees, Kelvin.

$$\Delta E = \Delta H_v - RT$$

$\Delta H_v$ = latent heat of vaporization, calories/(g. mole)
$R$ = 1.987 calories/(g. mole)(° K.)
$T$ = absolute temperature, ° K.

It has been found by means of solubility measurements, standardized at 77° F., that naphthenes or aromatic hydrocarbons with a solubility parameter greater than about 8.4 are quite soluble in these $\alpha$-oxophosphonates. Conversely, paraffin or naphthene hydrocarbons with lesser solubility parameters are much less miscible. It has also been found that the solubility parameters given above are affected by the temperature of the system. Monoolefins and diolefins exhibit much greater miscibility with these $\alpha$-oxophosphonates than with the corresponding paraffin hydrocarbons. Accordingly, a separation can be effected through either a difference in degree of saturation or, in the case of paraffin, naphthene, and aromatic compounds, through a difference in solubility parameter. In some cases, e.g., a mixture of $C_4$ hydrocarbons, natural volatility ratios of some constituent pairs are inverted by the presence of the solvent.

The following examples illustrate specific embodiments of the invention:

EXAMPLE 1

A number of hydrocarbon-type mixtures are employed in order to demonstrate the selectivity of diethyl propionylphosphonate. These tests are conducted at a number of temperatures as set forth in the table below. At the said temperatures at which the equilibrium measurements are made, at the solvent ratio set forth in the table, the relative volatility of the two components is determined. These values of relative volatility are defined in accordance with the description above.

The table of data also shows the enhancement per plate obtained when using a 10% (mole) solution of the more volatile component of each pair with 90% of the less volatile in an extractive distillation using diethyl propionylphosphonate as the solvent.

"Enhancement per plate" is calculated according to the expression $$Y = \frac{\alpha X}{1 + (\alpha - 1)X}$$

the percentage enhancement being 100Y. In the expression, Y and X refer to vapor and liquid molar compositions, respectively, of the more volatile hydrocarbon, taken on a solvent-free basis. Thus, $Y = 0.129$ as opposed to $X = 0.100$ indicates an enhancement of 12.9%.

*Table I*

| Run | Solute | Temp., ° F. | Solv. Ratio, Vol. Solv./ Vol. Solutes | Relative Volatility | Enhancement Per Plate (Percent) |
|---|---|---|---|---|---|
| 1 | n-Pentane / Pentene-1 | 150 | 12.6 | 1.09 / 1.00 | 10.8 |
| 2 | n-Pentane / Pentene-1 | 150 | 16.9 | 1.17 / 1.00 | 11.5 |
| 3 | n-Pentane / 2-Methylbutene-1 / Isoprene | 150 | 13.2 | 2.05 / 1.56 / 1.00 | 18.6 / 14.8 |
| 4 | n-Hexane / Cyclohexane | 169 | 5.67 | 3.58 / 1.00 | 28.5 |
| 5 | Butane / Butene / Butadiene | 150 | 9 | 1.53 / 1.65 / 1.00 | 14.5 / 15.5 |
| 6 | Methylcyclopentane / n-Hexane / Benzene | 150 | 9 | 2.82 / 6.45 / 1.00 | 23.8 / 42.9 |
| 7 | 2,4-Dimethylpentane / Cyclohexane / Benzene | 150 | 9 | 9.38 / 1.81 / 1.00 | 51.0 / 16.8 |

EXAMPLE 2

This example illustrates the use of diethyl benzoylphosphonate as the extractive distillation solvent. The relative volatilities of the respective hydrocarbon mixtures are set forth in the table below. The table of data also shows the enhancement per plate obtained using a 10% (mole) solution of the more volatile component of each pair with 90% of the less volatile in an extractive distillation using diethyl benzoylphosphonate as the solvent.

*Table II*

| Run | Solute | Temp., °F. | Solv. Ratio, Vol. Solv./Vol. Solutes | Relative Volatility | Enhancement Per Plate (Percent) |
|---|---|---|---|---|---|
| 1 | n-Pentane / Pentene-1 | 170 | 7.0 | 1.17 / 1.00 | 11.51 |
| 2 | n-Pentane / 2-Methylbutene-1 / 2-Methylbutene-2 / Isoprene | 164 | 12.6 | 2.64 / 1.70 / 1.03 / 1.00 | 22.7 / 15.9 / 10.3 |
| 3 | n-Octane / Octene-1 | 192 | 41.6 | 1.08 / 1.00 | 10.7 |
| 4 | n-Hexane / Cyclohexane | 190 | 2.82 | 4.00 / 1.00 | 30.8 |
| 5 | n-Hexane / Methylcyclopentane | 199 | 8.38 | 2.84 / 1.00 | 24.0 |
| 6 | Butane / Butene / Butadiene | 150 | 9 | 1.86 / 1.92 / 1.00 | 17.1 / 17.6 |
| 7 | Methylcyclopentane / n-Hexane / Benzene | 150 | 9 | 3.24 / 13.89 / 1.00 | 26.3 / 60.7 |
| 8 | 2,4-Dimethylpentane / Cyclohexane / Benzene | 150 | 1 | 4.90 / 1.39 / 1.00 | 35.3 / 13.4 |

EXAMPLE 3

The use of diethyl carboethoxyphosphonate as the extractive distillation solvent in the separation of normal pentane from pentene-1 is shown in the following data. The table of data also shows the enhancement per plate obtained using a 10% (mole) solution of the more volatile component of each pair with 90% of the less volatile in an extractive distillation using diethyl carboethoxyphosphonate as the solvent.

*Table III*

| Solute | Temp., °F. | Solvent Ratio, Vol. Solvent/ Vol. Solutes | Relative Volatility | Enhancement Per Plate (Percent) |
|---|---|---|---|---|
| n-Pentane / Pentene-1 | 150 | 12.8 | 1.24 / 1.00 | 12.1 |

EXAMPLE 4

This example illustrates the use of ethyl propyl carbomethoxyphosphonate as the extractive distillation solvent in the separation of normal pentane from pentene-1.

*Table IV*

| Solute | Temp., °F. | Solvent Ratio, Vol. Solvent/ Vol. Solutes | Relative Volatility | Enhancement Per Plate (Percent) |
|---|---|---|---|---|
| n-Pentane / Pentene-1 | 150 | 12.8 | 1.25 / 1.00 | 12.2 |

EXAMPLE 5

This example illustrates the use of ethyl butyl hexanoylphosphonate as the extractive distillation solvent in the separation of n-pentane from pentene-1.

*Table V*

| Solute | Temp., °F. | Solvent Ratio, Vol. Solvent/ Vol. Solutes | Relative Volatility | Enhancement Per Plate (Percent) |
|---|---|---|---|---|
| n-Pentane / Pentene-1 | 150 | 9 | 1.05 / 1.00 | 10.4 |

EXAMPLE 6

This example illustrates the use of ethyl isopropyl cyclohexanoylphosphonate as the extractive distillation solvent in the separation of n-pentane from pentene-1.

*Table VI*

| Solute | Temp., °F. | Solvent Ratio, Vol. Solvent/ Vol. Solutes | Relative Volatility | Enhancement Per Plate (Percent) |
|---|---|---|---|---|
| n-Pentane / Pentene-1 | 150 | 9 | 1.12 / 1.00 | 11.1 |

EXAMPLE 7

This example illustrates the use of ethyl methyl benzoylphosphonate as the extractive distillation solvent in the separation of n-pentane from pentene-1.

*Table VII*

| Solute | Temp., °F. | Solvent Ratio, Vol. Solvent/ Vol. Solutes | Relative Volatility | Enhancement Per Plate (Percent) |
|---|---|---|---|---|
| n-Pentane / Pentene-1 | 150 | 9 | 1.22 / 1.00 | 11.9 |

A demonstration of the effectiveness of the α-oxophosphonates described herein as extractive distillation solvents may be made by reference to data on the hydrocarbon selectivity and relative volatilities using a 2:1 volume ratio acetone/water solvent as shown in the following table:

*Table VIII*

| Hydrocarbon | Relative Volatility | |
|---|---|---|
| | Acetone/ Water | Diethyl Benzoylphosphonate |
| n-Pentane | 1.43 | 2.64 |
| 2-Methylbutene-1 | 1.49 | 1.70 |
| Isoprene | 1.00 | 1.00 |

Selectivities and relative volatilities for the hydrocarbons listed in the table are seen to be substantially less using the acetone/water solvent than the α-oxophosphonate of the present invention.

The phosphonates used in this invention may be prepared by reacting trialkyl phosphites with hydrocarbon acid chlorides (when R′ in the general formula is hydrocarbon), or with alkyl or aryl chloroformates (when R′ is an alkoxy or aryloxy group).

For example, diethyl carboethoxyphosphonate having the formula

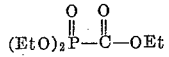

may be prepared by placing 163 g. of ethyl chloroformate in a one-liter four-neck flask having a stirrer, thermometer, protected condenser and dropping funnel and then 249 g. of freshly distilled triethyl phosphite is added to the flask over a 0.75 hour period, keeping the temperature of the flask at 23–33° C. with cooling. After the triethyl phosphite is added, cooling is discontinued and the temperature rises to 47° C. by the heat of reaction. Ethyl chloride is evolved and the residual clear, colorless solution is warmed to 134° C. in 0.5 hour and heated at this temperature for another 15 minutes.

The reaction mixture is then distilled to a constant boiling point (87°/0.04 mm.) to give 293 g. (corresponding to a 93% yield) of clear colorless residue. The product was calculated for $C_7H_{15}O_5P$ and analyzed for carbon, hydrogen, and phosphorus. It contained 40.11% carbon (theory 40.11%), 7.21% hydrogen (theory 7.20%), and 15.12% phosphorus (theory 14.76%).

Other typical α-oxophosphonates within the scope of the instant invention, which are prepared in the same manner recited in the preceding paragraph, include: dibutyl carbohexoxyphosphonate, didecyl carboethoxyphosphonate, dibutyl carbophenoxyphosphonate, ethyl propyl carbonaphthyloxophosphonate, diethyl carbo-3-propylphenoxyphosphonate, dioctyl propionylphosphonate, butyl ethyl pentaneoylphosphonate, ethyl propyl butanoylphosphonate, didecylbenzoylphosphonate, dipropyl naphthoylphosphonate and dihexyl 4-methylbenzoylphosphonate.

While exemplary methods are given for utilizing the α-oxophosphonates disclosed herein as extractive distillation agents, the invention is not to be construed as limited to the specific examples recited.

What is claimed is:

1. The method of separating classes of hydrocarbons from a mixture comprising hydrocarbons of the classes consisting of paraffins, monoolefins, diolefins, naphthenes and aromatic hydrocarbons which comprises contacting the said mixture with an α-oxophosphonate having the following structural formula:

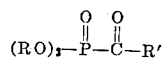

wherein R represents an alkyl radical and R′ is selected from the group consisting of hydrocarbon, alkoxy radicals, aryloxy and alkyl-substituted aryloxy radicals wherein the aryl moiety contains from 6 to 10 carbon atoms and the alkyl substituent contains up to 3 carbon atoms in an extractive distillation separation, withdrawing a vapor fraction containing the more volatile of the said classes, and also withdrawing a liquid fraction containing the less volatile classes dissolved in the said α-oxophosphonate and thereafter separating the individual hydrocarbon classes from each of said fractions by conventional means and stripping the said α-oxophosphonate from the hydrocarbons dissolved therein.

2. The method of separating paraffins from a mixture comprising hydrocarbons of the classes consisting of paraffins, monoolefins, diolefins, naphthenes and aromatic hydrocarbons which comprises contacting the said mixture with an α-oxophosphonate having the following structural formula:

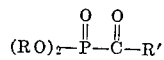

wherein R represents an alkyl radical and R′ is selected from the group consisting of hydrocarbon, alkoxy radicals, aryloxy and alkyl-substituted aryloxy radicals wherein the aryl moiety contains from 6 to 10 carbon atoms and the alkyl substituent contains up to 3 carbon atoms in an extractive distillation separation, withdrawing a vapor fraction containing the more volatile paraffins and also withdrawing a liquid fraction containing the remaining less volatile of the said hydrocarbon classes dissolved in the said α-oxophosphonate solvent and thereafter stripping the said solvent from the hydrocarbons dissolved therein.

3. The method according to claim 2 wherein the paraffin is pentane.

4. The method according to claim 3 wherein the phosphonate is diethyl propionylphosphonate.

5. The method according to claim 3 wherein the phosphonate is diethyl benzoylphosphonate.

6. The method according to claim 3 wherein the phosphonate is diethyl carboethoxyphosphonate.

7. The method according to claim 3 wherein the phosphonate is ethyl propyl carbomethoxyphosphonate.

8. The method according to claim 3 wherein the phosphonate is ethyl butyl hexanoylphosphonate.

9. The method according to claim 3 wherein the phosphonate is ethyl isopropyl cyclohexanoylphosphonate.

10. The method according to claim 2 wherein the paraffin is hexane.

11. The method of separating diolefins from a mixture comprising hydrocarbons of the classes consisting of paraffins, monoolefins and diolefins which comprises contacting the said mixture with an α-oxophosphonate having the following structural formula:

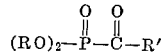

wherein R represents an alkyl radical and R′ is selected from the group consisting of hydrocarbon, alkoxy radicals, aryloxy and alkyl-substituted aryloxy radicals wherein the aryl moiety contains from 6 to 10 carbon atoms and the alkyl substituent contains up to 3 carbon atoms in an extractive distillation separation, withdrawing a vapor fraction containing the more volatile paraffins and monoolefins and also withdrawing a liquid fraction containing the less volatile diolefins dissolved in the said α-oxophosphonate and thereafter stripping the said α-oxophosphonate from the diolefins dissolved therein.

12. The method according to claim 11 wherein the diolefin is isoprene, the monoolefin is methylbutene and the paraffin is pentane.

13. The method according to claim 11 wherein the diolefin is butadiene, the monoolefin is butene and the paraffin is pentane.

14. The method according to claim 13 wherein the α-oxophosphonate is diethyl propionylphosphonate.

15. The method according to claim 13 wherein the α-oxophosphonate is diethyl benzoylphosphonate.

16. The method of separating naphthenes from a mixture comprising hydrocarbons of the classes consisting of paraffins, monoolefins, diolefins, naphthenes and aromatic hydrocarbons which comprises contacting the said mixture with an α-oxophosphonate having the following structural formula:

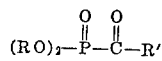

wherein R represents an alkyl radical and R′ is selected from the group consisting of hydrocarbon, alkoxy radicals, aryloxy and alkyl-substituted aryloxy radicals wherein the aryl moiety contains from 6 to 10 carbon atoms and the alkyl substituent contains up to 3 carbon atoms in an extractive distillation separation, withdrawing a vapor fraction containing the more volatile paraffins, naphthenes and monoolefins and also withdrawing a liquid fraction containing the less volatile diolefins and aromatic hydrocarbons dissolved in the said α-oxophosphonate and thereafter contacting the hydrocarbon mixture comprising the vapor fraction with additional α-oxophosphonate solvent in a second extractive distillation to remove the more volatile paraffins and monoolefins as a vapor fraction from the less volatile naphthenes dissolved in said solvent and thereafter stripping the said α-oxophosphonate from the naphthenes dissolved therein.

17. The method according to claim 16 wherein the naphthene is methylcyclohexane and the α-oxophosphonate is diethyl propionylphosphonate.

18. The method of separating aromatic hydrocarbons from a mixture comprising hydrocarbons of the classes consisting of paraffins, monoolefins, diolefins, naphthenes and aromatic hydrocarbons which comprises contacting the said mixture with an α-oxophosphonate having the following structural formula:

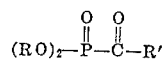

wherein R represents an alkyl radical and R′ is selected from the group consisting of hydrocarbon, alkoxy radicals, aryloxy and alkyl-substituted aryloxy radicals wherein the aryl moiety contains from 6 to 10 carbon atoms and the alkyl substituent contains up to 3 carbon atoms in an extractive distillation separation, withdrawing a vapor fraction containing the more volatile paraffins, monoolefins, diolefins and naphthenes, and also withdrawing a liquid fraction containing the less volatile aromatic hydrocarbons dissolved in the said α-oxophosphonates and thereafter stripping the said α-oxophosphonates from the aromatic hydrocarbons dissolved therein.

19. The method according to claim 18 wherein the aromatic hydrocarbon is benzene.

References Cited in the file of this patent

UNITED STATES PATENTS

| | | |
|---|---|---|
| 2,491,920 | Ernsberger | Dec. 20, 1949 |
| 2,567,228 | Morrell et al. | Sept. 11, 1951 |
| 2,719,167 | Schmidt | Sept. 7, 1955 |

OTHER REFERENCES

Blake et al.: Article, I and EC, vol. 50, No. 12, December 1958, pages 1763–1767.